Patented May 28, 1940

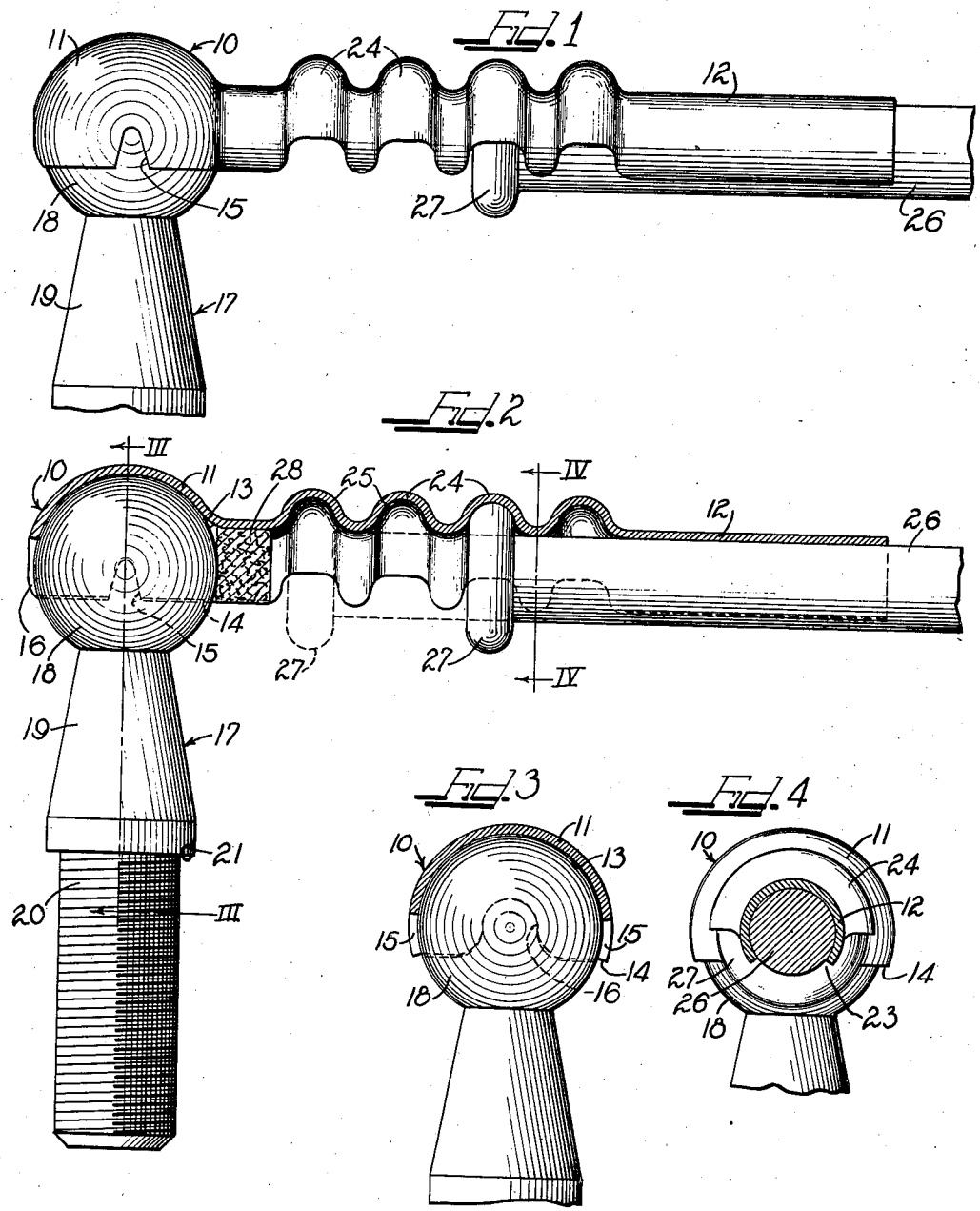

2,202,276

UNITED STATES PATENT OFFICE 2,202,276

BALL JOINT

Anthony Venditty, Detroit, Mich., assignor to Thompson Products Incorporated, Cleveland, Ohio, a corporation of Ohio Application February 3, 1938, Serial No. 188,401

8 Claims. (Cl. 287—90)

This invention relates to ball and socket joints and more specifically relates to joints of the type wherein a ball stud can be snapped into a ball socket.

The joints of this invention are especially adapted for use in throttle rod assemblies although it should be understood that the structures of this invention are not limited to such use.

According to this invention a sheet or strip of spring steel is stamped to define a ball socket on the end thereof and an open sided hollow shank extending laterally from the socket. The socket has an opening giving entrance thereto with the diameter of the opening being less than the great circle of the socket. Likewise the open side of the shank is of less width than the diameter of the shank.

The shank is preferably provided with at least one outturned bead defining a recess in the shank.

After the stamping operation the resulting housing member can be heat-treated to temper the metal.

The ball end of the ball stud is adapted to be snapped into the ball socket through the opening of the socket and, since the opening is of less diameter than the great circle of the socket, the ball will be held in the socket.

Likewise a throttled rod or other rod can be snapped into the shank portion of the housing through the open side thereof. Since the open side of the shank is smaller than the diameter of the shank, the rod will be snapped into the shank and retained therein. The rod is preferably provided with a headed portion for seating in the recess provided by the bead of the shank to prevent endwise removal of the rod.

It should be readily understood that the stamped steel housings of the joints of this invention can be readily snapped into position on throttle rods or other lever assemblages while the ball ends of studs or other arm members can be snapped into the ball socket of these housings. Thus two throttle rods can be operatively connected by merely snapping the joints of this invention into position.

It is then an object of this invention to provide a ball and socket construction wherein the housing member is stamped from a single piece of sheet metal.

A further object of this invention is to provide a housing member for ball and socket joints from spring steel sheets.

A further object of this invention is to provide a ball and socket joint having a shank portion adapted to be snapped on the end of a rod.

A further object of this invention is to provide a joint housing having a ball socket with an opening of less diameter than the great circle of the socket and being formed of resilient material so that a ball member can be snapped through the opening into seating engagement in the socket.

Other and further objects of the invention will become apparent to those skilled in the art from the following detailed description of the annexed sheet of drawings which discloses a preferred embodiment of the invention.

On the drawing:

Figure 1 is a fragmentary side elevational view of a ball and socket joint according to this invention.

Figure 2 is a vertical cross-sectional view taken longitudinally through the housing of the joint shown in Figure 1, with parts of the joint structure shown in elevation.

Figure 3 is a cross-sectional view, with a part shown in elevation, taken along the line III—III of Figure 2.

Figure 4 is a cross-sectional view, with parts shown in elevation, taken along the line IV—IV of Figure 2.

As shown on the drawing:

In Figures 1 to 4 inclusive the reference numeral 10 designates generally a joint housing having a ball end 11 and a shank portion 12 extending laterally from the ball end 11.

The housing 10 is formed by stamping a flat sheet of spring steel to define the ball end 11 and shank 12. After the stamping operation the housing can be heat treated to temper the same.

The ball socket 11 has a segmental spherical inner wall 13 of greater than hemispherical size. A circular opening 14 provides entrance to the socket 11. The entrance 14 is of smaller diameter than the great circle of the socket.

Notches or gussets 15 are cut in the side walls of the socket 11 at the opening 14 thereof and preferably extend back to at least the great circle of the socket.

A third gusset 16 can be cut in the end wall of the socket as shown.

The gussets 15 and 16 provide for the expansion and contraction of the opening 14 to permit passage into the socket of a member having a larger diameter than the normal diameter of the opening 14.

A stud 17 having a ball end 18, a tapered neck 19 extending from the ball end and a threaded shank 20 of less diameter than the large end of the tapered neck 19, has the ball end 18 thereof snapped into the socket 11 in bearing engagement with the bearing wall 13 of the socket.

A shoulder 21 is formed between the threaded portion 20 and neck 19 of the stud. A connecting member such as the eye end of a rod can be secured to the stud 17 in abutting relation to the shoulder 21 and to a nut (not shown) adapted to be threaded on the threaded shank 20 of the stud.

The diameter of the ball end 18 of the stud 17 is larger than the diameter of the opening 14. However since the socket 11 is made of spring steel, and since gussets such as 15 and 16 are provided around the opening 14, a slight pressure will expand or enlarge the opening to permit the ball to slide into the socket. As soon as the great circle of the ball end slides past the opening 14, the opening will again contract to its normal size and will thus cause the ball end to be retained in the socket.

As best shown in Figure 4 the shank 12 of the housing member 10 is hollow and of segmental cylindrical contour having an open side 23 extending the full length thereof. The open side 23 is of less width than the diameter of the shank 12.

The shank 12 is provided with one or more outturned beads 24 extending therearound intermediate the ends of the shank. The beads 24 provide recesses 25 in the shank of greater diameter than the shank diameter.

A rod 26 having substantially the same diameter as the internal diameter of the shank 12, has an annular head portion 27 formed on the end thereof. The head 27 has about the same diameter as the diameter of the recesses 25 of the shank 12 and is provided with a contour of substantially the same shape as the contour of the recesses.

The rod 26 is adapted to be snapped into the shank 12 with the head 27 thereof seated in a recess 25 of the shank to prevent endwise removal of the rod. Since the metal forming the shank is of spring steel and since the opening 23 to the shank is of less diameter than the diameter of the rod and the diameter of the shank, the rod 26 can be forced through the opening 23 causing the same to expand to permit passage of the rod therethrough. Likewise a bead 24 of the shank 12 can have the opening thereto expand to permit passage of the head 27 of the rod into the recess defined by the bead. The spring metal will contract into normal position when the rod is seated in the shank to retain the same therein.

When a plurality of beads 24 are provided, selective positioning of the rod 26 in the shank 12 is permitted. Thus when it is desired to shorten the distance between the end of the rod and the ball socket 11, the head 27 of the rod may be seated in a recess 25 adjacent to the ball socket 11 as shown in dotted lines in Figure 2.

A lubricant impregnated wick or plug 28 can be seated in the shank 12 immediately adjacent the socket 11 so as to lubricate the ball end 18 of the stud 17. Any suitable type of lubricating wick can be used.

From the above description it should be understood that this invention provides for a ball and socket joint wherein a ball stud can be snapped into a socket and wherein a rod member can be snapped into a shank carried by the socket. The entire socket construction can be formed from a single piece of spring steel by a stamping operation.

The joints of this invention can be made in very small sizes if desired and can be readily mounted in throttle rod assemblies to operatively join throttle rods or to join the rods with a throttle lever.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A snap-on connection device comprising a metal member defining a ball joint housing having a hollow elongated shank with a resiliently expansible longitudinal opening along the length thereof, said shank having a localized transverse area therein of different size than the main interior of the shank, said area communicating at its ends with the elongated opening giving entrance to the shank whereby a rod having a shank fitting portion and a localized mating portion for the transverse area in the shank can be snapped through the expansible slot and retained in the shank with the localized shank area and the mating rod portion holding the rod against axial removal.

2. A snap-on connection device comprising a metal member defining a joint socket having a resiliently expansible and contractible opening giving entrance thereto and a hollow shank extending from the socket, said shank having a resiliently expansible and contractible slot along the length thereof, said shank also having a localized enlarged transverse recess therein communicating with the slot whereby members having heads larger than the socket openings and the slot openings can be snapped into and retained in the socket and shank respectively.

3. A snap-on connection device comprising a metal member defining a ball socket having a resiliently expansible opening giving entrance thereto and an elongated hollow shank extending from the socket, said shank having a resiliently expansible slot along the length thereof and a hollow bead extending transversely around the shank defining an enlarged recess in the shank communicating at its ends with the slot.

4. A snap-on connection device comprising a stamped metal member defining a ball socket having a resiliently expansible opening giving entrance thereto, said opening being smaller than the great circle of the socket, an elongated hollow shank extending from the socket having a resiliently expansible slot along the length thereof, said slot being of less width than the interior of the shank and a plurality of spaced hollow beads along the length of the shank, said beads extending transversely around the shank defining enlarged recesses therein communicating with the slot whereby a headed rod can be snapped lengthwise into the shank with the head thereof seated in a selected recess to hold the rod against axial removal.

5. A connection member for joining a headed rod with a ball ended stud comprising a stamped sheet of spring steel defining a ball socket at one end thereof and an integral hollow shank extending from the socket, said socket having an opening smaller than the great circle of the socket giving entrance to the socket, said shank having an open side of less width than the interior of the shank, an outturned bead on the shank defining a recess in the shank adapted to receive the rod head therein, the metal surrounding the socket opening and the metal surrounding the open side of the shank being resiliently expansible whereby the ball end of a stud of larger diameter than the socket opening can be snapped into the socket and retained therein and the end of a headed rod of larger size than the width of the shank opening can be snapped into the shank and retained therein with the rod head seated in the bead recess preventing axial removal of the rod.

6. A throttle rod connecting device comprising a stamped spring metal member defining a universal joint socket at one end thereof and a hollow shank extending from the socket, said shank having a longitudinal opening along the length thereof giving entrance thereto, said shank also having a localized transverse area therein of different size than the main interior of the shank, said area communicating at its ends with the elongated opening whereby a throttle rod having a localized mating portion for the transverse area in the shank can be snapped through the shank opening and retained in the shank with the localized shank area and mating rod portion holding the rod against axial removal.

7. In a ball and socket joint the improvements which comprise a socket member having an elongated hollow shank extending therefrom, said shank provided with an expansible and contractible slot along the length thereof, a plurality of spaced transverse beads around said shank defining enlarged recesses in the shank communicating with the slot, a headed rod snapped into said shank with the head thereof seated in one of said recesses and said shank having a chamber adjacent the socket communicating with the bearing surface in the socket and adapted for receiving lubricating means.

8. A snap-on connection device comprising a metal member defining a housing for an articulated joint having a hollow elongated shank with a resiliently expansible longitudinal slot along the length thereof, said shank having a localized area therein of different size than the main interior of the shank whereby a member having a shank fitting portion and a localized mating portion for said area in the shank can be snapped through the expansible slot and retained in the shank with the localized shank area and mating portion of the member holding the member against axial removal.

ANTHONY VENDITTY.